Aug. 7, 1928.

R. L. DENNISON 1,680,134

DIFFERENTIAL GEAR

Original Filed Dec. 22, 1924   3 Sheets-Sheet 1

Aug. 7, 1928.

R. L. DENNISON

DIFFERENTIAL GEAR 1,680,134

Original Filed Dec. 22, 1924  3 Sheets-Sheet 2

Inventor
R. L. Dennison

Attorney

Aug. 7, 1928.

R. L. DENNISON 1,680,134

DIFFERENTIAL GEAR

Original Filed Dec. 22, 1924   3 Sheets-Sheet 3

Inventor
R. L. Dennison
By
Attorney

Patented Aug. 7, 1928.

1,680,134

UNITED STATES PATENT OFFICE.

ROBERT L. DENNISON, OF NEW YORK, N. Y.

DIFFERENTIAL GEAR.

Application filed December 22, 1924, Serial No. 757,546. Renewed November 15, 1926.

This invention relates to gearing, and more particularly to differential gears.

An object of the invention is to provide a differential gearing embodying a main drive member which is provided with a plurality of recesses to receive pinions by means of which the gears on the axle sections are driven, which pinions are provided with reduced end portions passing through reduced openings in the main driven member forming relatively long bearings for each of the pinions and thus preventing excessive wear.

A further object of the invention is the provision of mechanically operated means for locking the differential gearing when desired.

A further object of the invention is the provision of locking means which will automatically release when the pressure of the foot is removed from the operating pedal, thereby preventing the locking mechanism from being accidentally applied or from being left in position through forgetfulness.

A further object is to provide a durable differential gear in which wear is reduced to a minimum.

Figure 2:
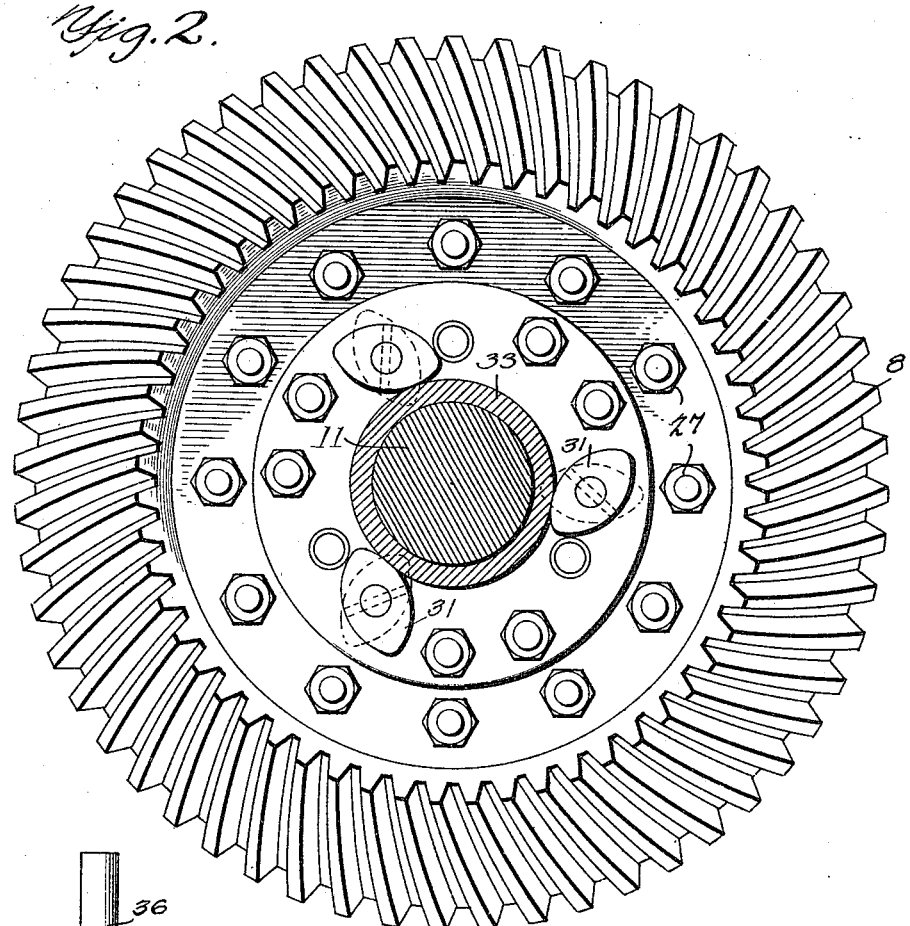
Figure 3:
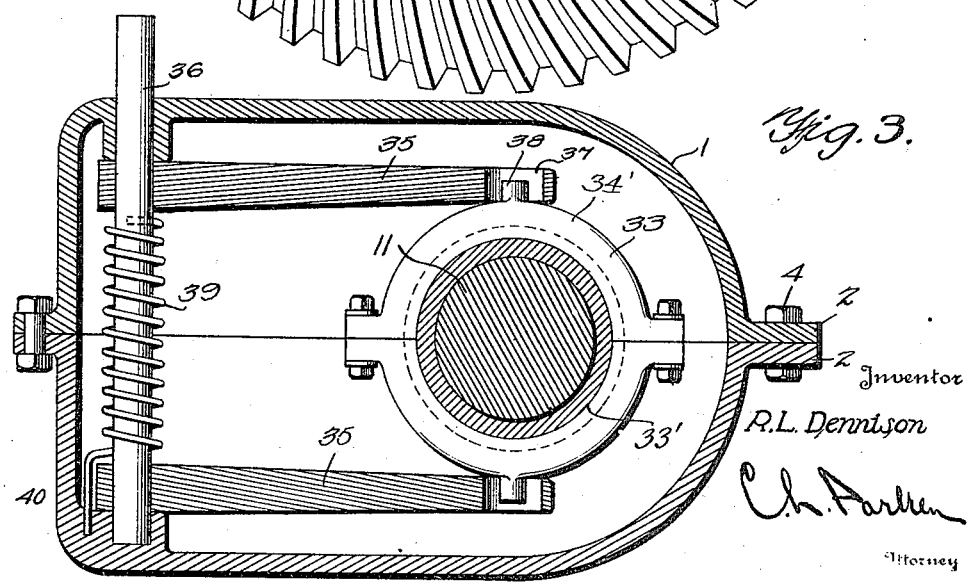
Figure 4:
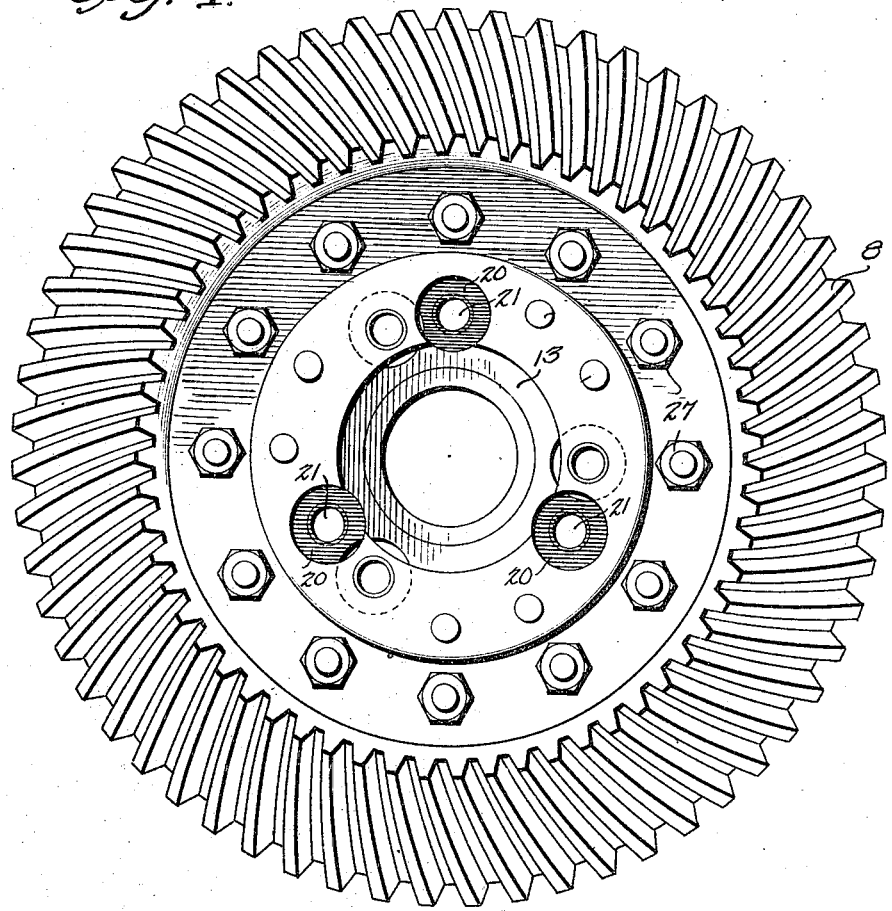
Figure 5:
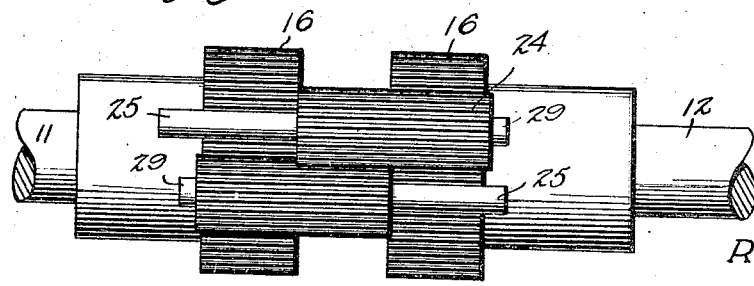

In the accompanying drawings, I have shown one embodiment of the invention. In this showing:

Figure 1 is a plan view with the upper half of the differential gear housing removed, parts being shown in section, Figure 2 is a vertical sectional view on line 2—2 of Figure 1, showing the locking mechanism in operative position, Figure 3 is a similar view on line 3—3 of Figure 1, Figure 4 is a similar view on line 4—4 of Figure 1, and, Figure 5 is a plan view of a portion of the axle sections showing a pair of the driving pinions.

Referring to the drawings, the reference numeral 1 designates generally a differential housing which may be formed in two sections, having abutting flanges 2. These flanges are provided with suitable openings 3 for the reception of bolts 4 or other suitable fastening elements. The housing is suitably shaped to receive the differential gear. At the front of the housing each of the sections is provided with a recess, forming an opening for the reception of a bushing 5 or bearing member through which the drive shaft 6 of the vehicle extends. This drive shaft is provided with a pinion 7 on its rear end, meshing with a gear 8. The gear 8 is secured to a main driven member 9 by means of bolts 10, or other suitable fastening elements. As shown, the main driven member 9 is of substantial size and is cylindrically shaped with its longitudinal axes extending transversely of the gear housing. The rear axle of the vehicle is formed in two sections 11 and 12, which extend through a central opening 13 in the main driven member and one of which is provided with a reduced extension 14 on its inner end, adapted to be received in an opening in the other section. The sides of the differential housing are provided with suitable bearings 15 for the reception of the axle sections. It will thus be apparent that the driven member is supported by the axle sections which are in turn supported by the bearings 15.

As shown, the axle sections are provided with gears or pinions 16, adjacent their inner ends, which are received in the central recess 13 of the driven member and which are of substantially the same diameter as said recess. Centrally of the driven member, the recess 13 is reduced in cross section, as at 17, and a bushing 18 is arranged in this reduced portion. Similarly, the inner ends of the axle sections are reduced in cross section, as at 19, to snugly fit within the bushing or bearing 18.

Adjacent each side, the main driven member is provided with a plurality of cylindrical recesses 20, the centers of which are equally spaced from the center of the main shaft or axle. These recesses are disposed around the periphery of the main central recess 13. These cylindrical recesses extend from each side of the driven member to the opposite end of the reduced portion 17 of the central passage and are arranged alternately on opposite sides of the driven member. Extending from each of the cylindrical recesses 20, and concentric therewith, is a reduced recess or passage 21 adapted to receive a bearing liner or bushing 22. As shown, the bushing projects beyond the end of the recess. Pinions 24 are arranged in the concentric recesses 20 and these pinions extend into the main central recess 13 and mesh with the pinions 16 carried by the axle sections. The pinions are provided with reduced shafts 25, which fit snugly within the bushings or bearing liners 22. As shown, (see Figure 5), one set of pinions 24 mesh with the gears or pinions 16 on one section of the axle and the other set mesh with the gears or pinion on the other section of the axle. Side plates 26 are secured to the main driven member by suitable fastening elements 27. These side plates engage shoulders 28, formed on the axle sections to prevent outward displacement of the axle sections. As shown, the side plates are provided with openings adapted to receive shafts 25 carried by the driving pinions 24, and the bushings 22 extend through these openings. On the opposite side, the pinions are provided with stub shafts 29, extending through openings in the side plate, and suitable bushings 30 are arranged around these stub shafts.

Suitable means are provided for locking the differential mechanism to prevent independent rotation of the two sections of the axle. As shown, the set of shafts 25 from one set of pinions are longer than the other set and project beyond the stub shafts 29 (see Figure 5). These extended portions are adapted to receive star wheels 31, which are secured thereto by means of pins 32 and normally revolve with the shafts and pinions. When the mechanism is functioning as a differential, the star wheels are free to revolve. A sleeve 33 surrounds a portion of one of the axle sections and this sleeve is provided with a beveled face 34 (see Figure 1) adapted to enter beneath the star wheels, as shown in Figure 2 of the drawings, and lock them against rotation. The sleeve 33 is provided with an annular groove 33' adapted to receive a split collar 34'. This collar is adapted to be moved transversely of the differential housing by means of a pair of arms 35, mounted on a vertically disposed pin or shaft 36. As shown, the inner ends of the arms are provided with openings 37, adapted to receive pins 38 carried by the collar, the entire device functioning as a yoke. A spring 39 surrounds the pin 36, and one end of this spring is anchored in the differential casing, as at 40. Obviously, movement of the collar 34' is adapted to slide the sleeve 33 on the shaft 11.

In operation, the shaft 6 is driven from the engine or other source of power and the gear 7 carried by the main shaft drives the gear 8. This revolves the entire assembly within the differential housing which is supported in the main bearings 15 at the sides of the differential housing. Attention is called to the reduced portion 17 of the main central passage of the driven member, which receives the inner ends of the axle sections and is provided with a bearing member 18. By supporting the axle sections in this manner at their inner ends, a more durable construction is obtained. The pinions 24 travel around the center of the axle and cause the pinions 16 to rotate on their own axes. As the pinions 24 are normally free to revolve, the differential function is performed in the usual manner. Heretofore, these pinions have been mounted in bearings in the side plates 26 and slight wear of the pinions will cause them to get out of alinement and thus increase the wear on the driving pinion 24 and the driven pinion 16. Particular attention is called to the fact that the pinions 24 are arranged in the recesses 20 and are provided with relatively long stub shafts 25 which are snugly received in the bushings 22, arranged in the recesses 21. The pinions, in addition, are supported in the side plates as shown, and are thus provided with bearings at each end, and the total length of the bearing portion is substantially equal to the length of the gear.

The gears may be locked at any time by merely rotating the shaft 36 to cause the bevel faced sleeve 33 to lock the star wheels 31 against rotation. This permits the differential mechanism to be locked before approaching a situation in which said locking is desirable. For instance, in approaching a bad stretch of road, the differential may be locked prior to reaching the bad stretch of road and thus prevent the vehicle from being stuck in a mud hole instead of waiting until the vehicle becomes stuck and then locking the differential. It has heretofore been proposed to automatically lock a differential gear when one of the wheels of the vehicle begins to spin, but in such constructions, it is necessary that the trouble be encountered before the mechanism functions.

Further attention is called to the fact that as soon as the pressure is removed from the operating pedal, the star shaped wheels, tending to revolve at all times, force the sleeve 33 to an inoperative position due to its beveled face and it is thus impossible to leave the locking mechanism in operative position through forgetfulness.

When the locking mechanism is brought into operative position, a small amount of play is still permitted between it and the star shaped wheels 31, which permits turning the wheels of the vehicle a slight amount in either direction. If desired, the operating pedal may be placed adjacent the foot pedal by means of which the brake of the motor vehicle is operated to permit the operator to lock the differential at the same time that the brake is applied, thus serving as a brake equalizer and removing the tendency to skid if the brakes are out of adjustment.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a differential gear, a main driven member, a pair of sets of pinions carried by said member, axle sections arranged adjacent said main driven member, each of said axle sections being provided with a pinion meshing with one of said sets of pinions, one of said sets of pinions being provided with stub shafts extending therefrom, star shaped members mounted on the ends of said stub shafts, and a tapered sleeve loosely mounted on one of said axle sections and adapted to slide to a position within said star shaped members to contact therewith and prevent rotation thereof.

2. In a differential gear, a main driven member, a pair of sets of pinions mounted in said member, each of said pinions meshing with one pinion of the other set, axle sections arranged adjacent said driven member, each of said axle sections being provided with a pinion meshing with one of said sets of pinions, the pinions of one set being provided with stub shafts extending from said driven member, star shaped members mounted on the ends of said stub shafts, and a tapered sleeve loosely mounted on said axle and adapted to slide thereon to a position within said star shaped members to contact therewith and prevent rotation thereof.

In testimony whereof, I affix my signature.

ROBERT L. DENNISON.